United States Patent
Takizawa et al.

[11] Patent Number: 6,146,307
[45] Date of Patent: Nov. 14, 2000

[54] SPEED RATIO CONTROLLER AND CONTROL METHOD OF AUTOMATIC TRANSMISSION

[75] Inventors: Satoshi Takizawa; Masato Koga; Mitsuru Watanabe, all of Kanagawa, Japan

[73] Assignee: Nissan Motor Co., Ltd., Yokohama, Japan

[21] Appl. No.: 09/338,594

[22] Filed: Jun. 23, 1999

[30] Foreign Application Priority Data

Jun. 23, 1998 [JP] Japan ............................ 10-175694

[51] Int. Cl.[7] .................................................. B60K 41/44
[52] U.S. Cl. .................................................. 477/37; 477/43
[58] Field of Search ................................ 477/37, 43, 44, 477/45, 48

[56] References Cited

U.S. PATENT DOCUMENTS

| 5,612,873 | 3/1997 | Ogawa | 477/43 X |
| 5,669,845 | 9/1997 | Muramoto et al. | 475/186 |
| 5,707,313 | 1/1998 | Suzuki | 477/43 X |
| 5,984,829 | 11/1999 | Minagawa et al. | 477/37 X |

FOREIGN PATENT DOCUMENTS

| 11-13872 | 1/1999 | Japan. |
| 11-13877 | 1/1999 | Japan. |

*Primary Examiner*—Sherry Estremsky
*Attorney, Agent, or Firm*—Foley & Lardner

[57] ABSTRACT

In a vehicle automatic transmission, a controller (61) feedback controls a speed ratio command signal by proportional/integral/differential (PID) control so as to minimize a deviation between a transient target speed ratio and a real speed ratio. When a difference between the command signal and that of the preceding control cycle is larger than a predetermined value, the controller (61) prohibits the increase of an integral correction amount of the PID control in the next control cycle. In this way, continuous increase of the feedback correction amount while the transmission can not follow the command signal is suppressed.

9 Claims, 11 Drawing Sheets

SPEED RATIO CONTROLLER AND CONTROL METHOD OF AUTOMATIC TRANSMISSION

FIELD OF THE INVENTION

This invention relates to speed ratio control of a continuously variable transmission of a vehicle.

BACKGROUND OF THE INVENTION

U.S. Pat. No. 5,669,845 discloses a feedback control method of a speed ratio of a continuously variable transmission such as a V-belt continuously variable transmission or toroidal continuously variable transmission of a vehicle.

Under this control, a controller calculates a final target speed ratio which is a final target value of a speed ratio, based on vehicle running conditions. In order to attain the final target speed ratio with a predetermined response speed, it calculates a transient target speed ratio as a target value for every control cycle. Based on the deviation of a real speed ratio from the latest transient target speed ratio, the controller performs feedback correction of the transient target speed ratio for this cycle, and controls the continuously variable transmission by a speed change command signal corresponding to the corrected transient target speed ratio.

SUMMARY OF THE INVENTION

An upper limiting value and lower limiting value are set to the speed change command signal so that it does not command a speed ratio which exceeds the mechanical operating limits of the continuously variable transmission. However, if the above-mentioned feedback correction is applied while limiting the speed change command signal in this way, the following problem arises.

Even if a feedback correction is added to the speed change command signal and the corrected value exceeds the upper limiting value or lower limiting value, the signal finally output will be limited to the upper limiting value or lower limiting value. In this case, the feedback correction is effectively not reflected in the output signal. The feedback correction is generally performed in the form of so-called proportional integral control. However, if the above situation continues under proportional integral control, the integral correction amount will increase cumulatively and the feedback correction amount will also continue to increase. Accumulation of the integral correction amount does not stop until the speed change command signal becomes less than the upper limiting value or higher than the lower limiting value. Such an increase in the integral correction amount may cause overshoot of the real speed ratio with respect to a preferred state. It also delays convergence of the real speed ratio to the transient target speed ratio, and may have an undesirable effect on speed change response.

It is therefore an object of this invention to prevent the feedback correction amount from increasing when a speed change command signal is limited by the upper limiting value or the lower limiting value.

In order to achieve the above object, this invention provides a speed ratio controller for controlling a speed ratio of a transmission of a vehicle in a predetermined control cycle. The controller comprises a sensor for detecting a running condition of the vehicle, a sensor for detecting a real speed ratio of the transmission, and a microprocessor programmed to calculate a transient target speed ratio of the transmission based on the vehicle running condition, calculate a deviation between the real speed ratio and the transient target speed ratio, calculate a feedback correction amount based on the deviation, calculate a command value based on the transient target speed ratio and the feedback correction amount, control a speed ratio of the transmission based on the command value, calculate a difference between the command value and a command value applied in a previous control cycle, and suppress increase of the feedback correction amount in a following control cycle when the difference is larger than a predetermined value.

This invention also provides a speed ratio controller comprising a sensor for detecting a running condition of the vehicle, a sensor for detecting a real speed ratio of the transmission, a mechanism for calculating a transient target speed ratio of the transmission based on the vehicle running condition, a mechanism for calculating a deviation between the real speed ratio and the transient target speed ratio, a mechanism for calculating a feedback correction amount based on the deviation, a mechanism for calculating a command value based on the transient target speed ratio and the feedback correction amount, a mechanism for controlling a speed ratio of the transmission based on the command value, a mechanism for calculating a difference between the command value and a command value applied in a previous control cycle, and a mechanism for suppressing increase of the feedback correction amount in a following control cycle when the difference is larger than a predetermined value.

This invention also provides a speed ratio control method for controlling a speed ratio of a transmission of a vehicle in a predetermined control cycle. The method comprises detecting a running condition of the vehicle, detecting a real speed ratio of the transmission, calculating a transient target speed ratio of the transmission based on the running conditions, calculating a deviation between the real speed ratio and the transient target speed ratio, calculating a feedback correction amount based on the deviation, calculating a command value based on the transient target speed ratio and the feedback correction amount, controlling a speed ratio of the transmission based on the command value, calculating a difference between the command value and a command value applied in a previous control cycle, and suppressing increase of the feedback correction amount in a following control cycle when the difference is larger than a predetermined value.

The details as well as other features and advantages of this invention are set forth in the remainder of the specification and are shown in the accompanying drawings.

DESCRIPTION OF THE PREFERRED EMBODIMENTS

Figure 1:
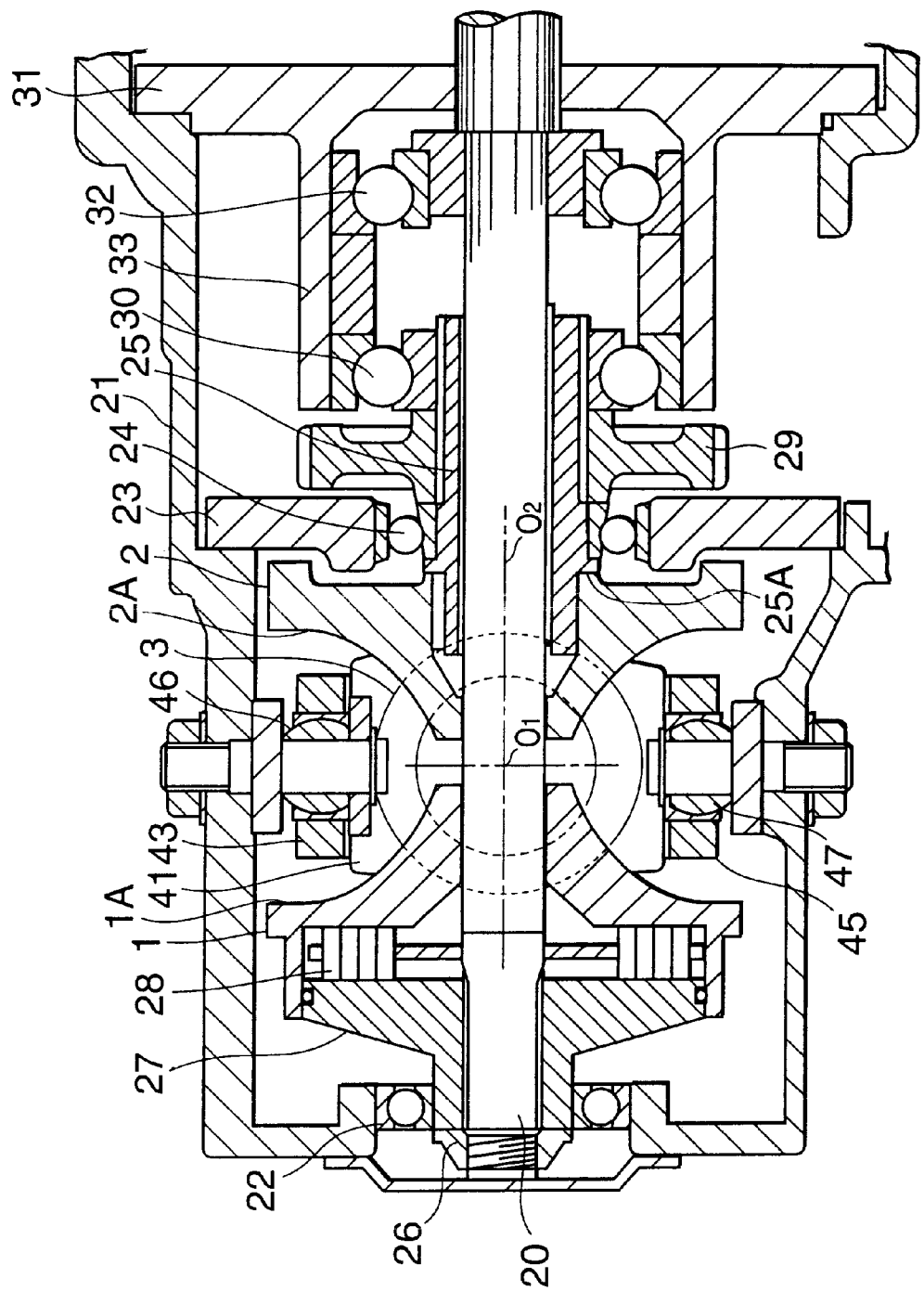
FIG. 1 is a longitudinal sectional view of a toroidal continuously variable transmission to which this invention is applied.

Referring to FIG. 1 of the drawings, a toroidal continuously variable transmission to which this invention is applied comprises an input shaft 20 and an output gear 29.

The input shaft 20 is connected to an engine of a vehicle via a torque converter. The engine and the torque converter are located on the right side of FIG. 1, but not shown. The output gear 29 outputs a rotation torque for driving the vehicle.

A cam flange 27 screws in to the tip of the input shaft 20. A nut 26 is tightened to the tip of the input shaft 20 so that the cam flange 27 is fixed to the input shaft 20.

The clam flange 27 is inserted in a cylindrically shaped back side part of an input disk 1. The input shaft 20 passes through the center of the input disk 1 leaving a small clearance. By this arrangement, the input disk 1 is maintained coaxial with the rotation shaft 20. The cam flange 27 is supported in a case 21 via a bearing 22, and the base end of the input shaft 20 is supported by an angular bearing 32.

A cam roller 28 is disposed between the cam flange 27 and the input disk 1. The cam roller 28 comprises a cam surface which presses the input disk 1 to the right of the figure according to the relative rotational displacement of the cam flange 27 and the input disk 1.

An output disk 2 is attached free to rotate relative to the input disk 1 on the outer circumference of the rotation shaft 20.

The input disk 1 and power output disk 2 comprise toroidal curved surfaces 1A, 1B which face each other, and a pair of power rollers 3 is gripped between these curved surfaces 1A, 1B.

The output disk 2 is spline jointed to a sleeve 25 supported on the outer circumference of the rotation shaft 20 via a needle bearing. A large diameter part 25A is formed in the sleeve 25 to support a thrust load which interacts on the power output disk 2 towards the right of FIG. 1.

The sleeve 25 is supported by an intermediate wall 23 of the case 21 via a radial bearing 24, and is also supported by an angular bearing 30. The angular bearing 30 and an angular bearing 32 are engaged inside a cylindrically-shaped cover 31 fixed to the case 21.

A spacer 33 which engages with the inside of the cover 31 are also gripped by the angular bearings 30, 32.

The thrust force exerted by the input disk 1 on the rotation shaft 3 towards the left of the drawing, and the thrust force exerted by the output disk 2 on the sleeve 25, therefore cancel each other out due to the spacers 33 gripped between the angular bearings 30, 32. Also, the load which acts on the angular bearings 30, 32 in the radial direction is supported by the cover 31.

The output gear 29 is spline jointed to the outer circumference of the sleeve 25. The rotation of the output gear 29 is transferred to the outside of the case 21 via a gear unit, not shown.

The power rollers 3 are supported by trunnions 41.

By driving the trunnions 41 in a direction perpendicular to the rotation shaft 20, the contact positions of the power rollers 3 with the input disk 1 and output disk 2 are changed. Due to this change of contact positions, a force is exerted on the power rollers 3 by the disks 1 and 2 so as to rotate the power rollers 3 around the axis $O_3$ as fulcrum which causes the gyration angle of the power rollers 3 to vary. As a result, the distance of the contact point between the power rollers 3 and the input disk 1 from the rotation shaft 20, and the distance of the contact point between the power rollers 3 and the output disk 2 from the rotation shaft 20, vary, and a speed ratio varies accordingly.

Figure 2:
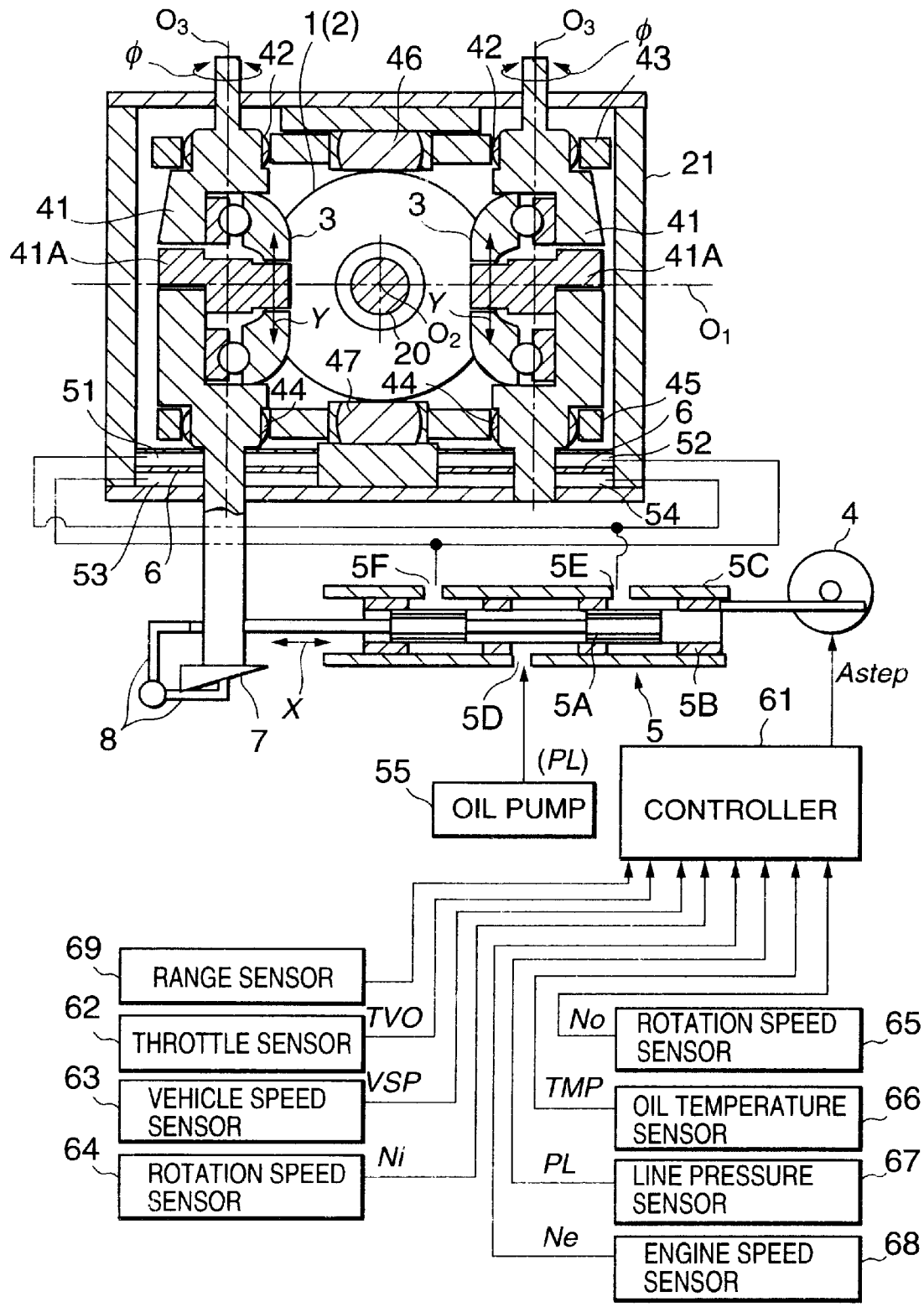
FIG. 2 is a schematic diagram of a speed ratio control device according to this invention.

As shown in FIG. 2, the trunnions 41 support the power rollers 3 such that they are free to rotate about an axis $O_1$ shown in FIG. 2 via a crank-shaped shaft 41A, and such that they are free to swing within a small range around the base end of the shaft 41A.

The upper end of each trunnion 41 is joined to an upper link 43 via a spherical joint 42, and a lower end is joined with a lower link 45 via a spherical joint 44. The upper link 43 and lower link 45 are supported in the case 21 via spherical joints 46 and 47, respectively. Due to these links, the pair of trunnions 41 always displaces in reverse directions and by an equal distance along an axis $O_3$ shown in FIG. 2.

A piston 6 is fixed to each of these trunnions 41. The piston 6 displaces the trunnion 41 along the axis $O_3$ according to an oil pressure balance of oil chambers 51, 53 and oil chambers 52, 54 which are formed in the case 21. Oil pressure is supplied to these oil chambers 51, 52, 53, and 54 from an oil pressure control valve 5.

The oil pressure control valve 5 comprises an outer sleeve 5C, inner sleeve 5B and a spool 5A which slides on the inside of the inner sleeve 5B. A port 5D which draws the pressure of an oil pump 55, port 5E connected to the oil chambers 51, 54, and port 5F connected to the oil chambers 52, 53 are formed in the outer sleeve 5C, respectively. The inner sleeve 5B is connected with a step motor 4 via a rack and pinion. Also, openings at the ends of the inner sleeve 5B are connected to drain passages, not shown.

The spool 5A is joined to a link 8. The link 8 displaces the spool 5A according to a rotational displacement around the axis $O_3$ and a displacement along the axis $O_3$ of a precess cam 7 fixed to the lower end of one of the trunnions 41, and mechanically feeds back the gyration angle of the power roller 3 to the oil pressure control valve 5.

The oil pressure control valve 5 changes the pressure supplied to the ports 5E, 5F according to a command signal Astep input to the step motor 4 from the controller 61. For example, when the spool 5A, outer sleeve 5B and inner sleeve 5C are in the positions shown in FIG. 2, the oil chambers 52, 53 receive high pressure oil of an pressure pump 55 from the port 5F, and oil in the oil chambers 51, 54 is drained via the port 5E.

As a result, the trunnion 41 on the left of the figure moves upwards along the axis $O_3$, and the trunnion 41 on the right of the figure moves downwards along the axis $O_3$. Hence, the rotation axis $O_1$ of the power roller 3 displaces from a neutral position at which it intersects a rotation axis $O_2$ of the input disk 1 and the output disk 2, i.e., the center of the rotation shaft 20, in the direction shown by the arrow Y in the drawing.

Due to this displacement, the input disk 1 and output disk 2 cause the power roller 3 together with the trunnions 41 to perform a rotational displacement around the axis $O_3$ and thereby continuously vary the speed ratio.

At this time, the precess cam 7 fixed to the lower end of one trunnion 41 feeds back the displacement amount in the direction of the axis $O_3$ of the trunnion 41 and the rotational displacement of the power roller 3 around the axis $O_3$, to the oil pressure control valve 5 via a link 8, and the spool 5A is displaced in the direction shown by the arrow X in the drawing.

When a speed ratio corresponding to the above-mentioned command signal Astep is attained by this feedback operation, the positional relationship of the spool 5A and inner sleeve 5B is restored to the neutral position wherein inflow and outflow of oil to and from all the oil chambers is stopped.

Hence, the trunnions 41 are maintained in a state where they are displaced in the direction of the axis $O_3$.

On the other hand, the power roller 3 which performed a rotational displacement around the $O_3$ axis pivots on the base end of the shaft 41A while maintaining the new gyration angle, and returns to the neutral position at which the axis $O_1$ and the axis $O_2$ intersect.

The reason why the precess cam 7 feeds back not only the rotational displacement around the axis $O_3$ of the power roller 3, i.e., the gyration angle, but also the axial displacement of the trunnion 41, is that the feedback of the axial displacement of the trunnion 41 works as a damping element which prevents the speed ratio control from oscillating. The command signal Astep is determined by the controller 61.

The controller 61 comprises a microprocessor comprising a central processing unit (CPU), random access memory (RAM), read-only memory (ROM) and input/output interface (I/O interface).

Signals are input to the controller 61 from a throttle sensor 62 which detects a throttle opening TVO of the engine, vehicle speed sensor 63 which detects a vehicle speed VSP, rotation speed sensor 64 which detects a rotational speed Ni of the input disk 1, rotation speed sensor 65 which detects a rotational speed No of the output disk 2, oil temperature sensor 66 which detects a temperature TMP of the above-mentioned oil pressure fluid, line pressure sensor 67 which detects a line pressure $P_L$, i.e., the oil pressure which the port 5D supplies from the oil pressure pump 55, engine speed sensor 68 which detects a rotation speed Ne of the engine, and a range sensor 69 which detects an operating mode of the transmission chosen by a selector lever, not shown.

The selector lever is a control unit attached to the continuously variable transmission to allow the driver to choose the operating mode of the continuously variable transmission, one range being chosen from plural candidates including a forward travel range, forward sport travel range, reverse range, neutral range, and parking range. The controller 61 outputs the command signal Astep computed as described below, to the motor 4 based on the above-mentioned signals.

Figure 3:
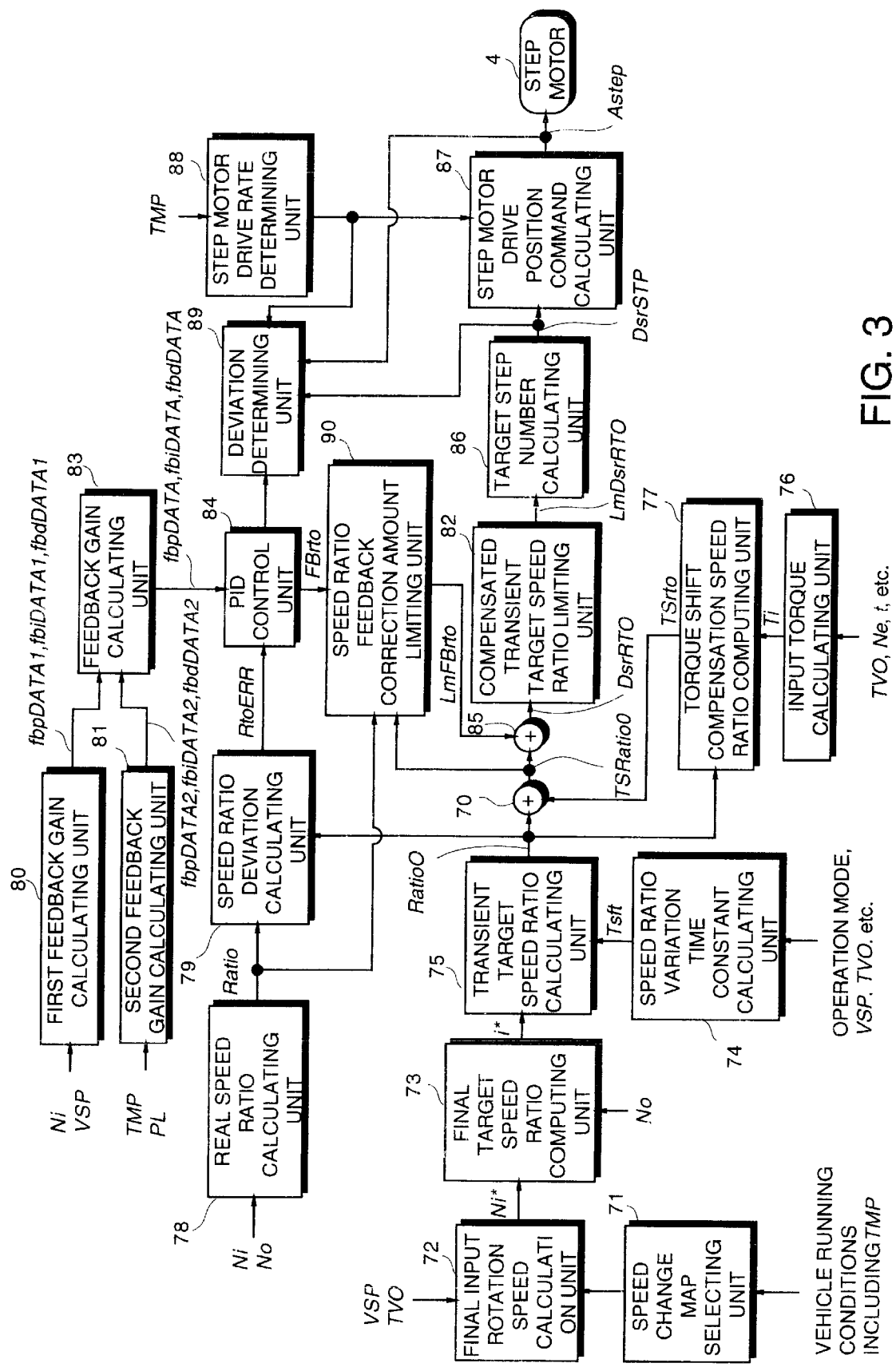
FIG. 3 is a block diagram for describing the structure of a controller according to this invention.

For this purpose, the controller 61 comprises processing units shown in FIG. 3. These units are virtual units constructed from the functions of the above-mentioned CPU, read-only memory and random access memory.

Figure 12:
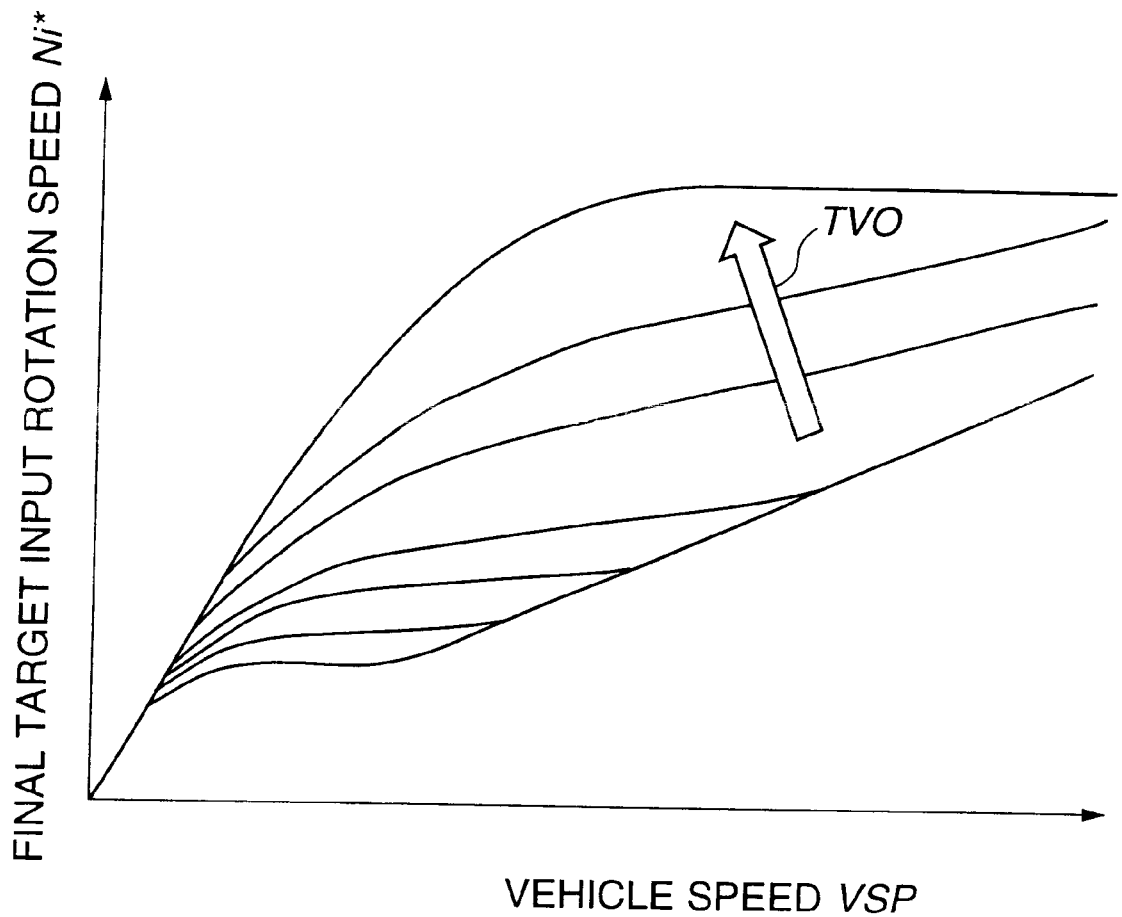
FIG. 12 is a diagram describing a speed change pattern of the toroidal continuously variable transmission.

A speed change map selecting unit 71 selects a speed change map to use based on an oil temperature TMP detected by the oil temperature sensor 66, and other vehicle running conditions including the activity of the engine exhaust purification catalyst. In this speed change map, a final input rotation speed Ni* which is a final target rotation speed of the input disk 1, is defined according to the vehicle speed VSP and the throttle opening TVO, as shown in FIG. 12. Plural maps of this kind are stored beforehand in the controller 61 with respect to various running conditions.

A final input rotation speed calculation unit 72 selects a map from the stored maps based on the vehicle running conditions, and obtains the final input rotation speed by referring to this map based on the vehicle speed VSP and throttle opening TVO. A final target speed ratio computing unit 73 divides the final input rotation speed Ni* by a rotation speed No of the output disk 2 detected by the rotation speed sensor 65, and calculates a final target speed ratio i*.

A speed ratio variation time constant calculating unit 74 determines a time constant Tsft of a speed ratio variation based on the operating mode of the transmission detected by the range sensor 69, vehicle speed VSP, throttle opening TVO, and deviation between a real speed ratio and a transient target speed ratio which will be described later.

The time constant Tsft is a constant specifying the rate of speed ratio variation until the final target speed ratio i* is attained, but as the time constant Tsft is varied dynamically in this embodiment as mentioned above, it is actually treated as a variable. The transient target speed ratio calculating unit 75 calculates a transient target speed ratio Ratio0 as a target value for every control cycle from the final target speed ratio i* and time constant Tsft.

The input torque calculating unit 76 calculates an engine output torque from the throttle opening TVO and engine speed Ne, and calculates a torque ratio t of the torque converter from the speed ratio of the input rotation speed and output rotation speed of the torque converter. The engine output torque is then multiplied by the torque ratio so as to calculate a transmission input torque Ti.

A torque shift compensation speed ratio computing unit 77 calculates a torque shift compensation speed ratio TSrto for compensating a torque shift which is a phenomenon peculiar to a toroidal continuously variable transmission from the aforesaid transient target speed ratio RatioO and the transmission input torque Ti. This torque shift will now be described.

When the toroidal continuously variable transmission is operating, the input disk 1 and output disk 2 grip the power rollers 3. This grip pressure acts as force tending to keep the power rollers 3 away from the axis $O_1$, and it deforms the trunnions 41 which support the power rollers 3. The deformation of the trunnions 41 introduces an error into the feedback operation of the precess cam 7, and produces a discrepancy between the command signal Astep input into the step motor 4 and the actual speed ratio realized by the command signal. This phenomenon is known as the torque shift.

The magnitude of the torque shift therefore varies according to the transient target speed ratio RatioO and transmission input torque Ti. The torque shift compensation speed ratio computing unit 77 calculates the torque shift compensation speed ratio TSrto from the transient target speed ratio RatioO and transmission input torque Ti by looking up a map stored beforehand in the controller 61. The torque shift compensation speed ratio TSrto is input into an adder 70 together with the transient target speed ratio RatioO.

The adder 70 adds the torque shift compensation speed ratio TSrto to the transient target speed ratio RatioO to calculate a torque shift compensated speed ratio TSRatio0. This torque shift compensated speed ratio TSRatio0 is equivalent to the target value of an open loop control of speed ratio.

The controller 61 also adds a feedback correction to this torque shift compensated speed ratio TSRatio0 to calculate the command signal Astep.

To make the real speed ratio follow the transient target speed ratio RatioO, the speed ratio feedback control performed by the controller 61 adds a correction to the signal output to the step motor 4. The correction is performed by software. The feedback control performed by the above-mentioned precess cam 7 is control performed with hardware so that the speed ratio of the continuously variable transmission coincides with the command signal Astep, and is therefore different from the feedback control performed by the controller 61.

Now, a real speed ratio calculating unit 78 computes the real speed ratio Ratio of the transmission by dividing the input rotation speed of the transmission, i.e., the rotation speed Ni of the input disk 1, by the output rotation speed, i.e., the rotation speed No of the output disk 2. A speed ratio deviation calculating unit 79 subtracts the real speed ratio Ratio from the transient target speed ratio Ratio0 to calculate the speed ratio deviation RtoERR.

Based on the speed ratio deviation RtoERR, a first feedback gain calculating unit 80 sets a first feedback gain for feedback controlling the speed ratio on the basis of a proportional integral differential (PID) control known in the art.

The parameters set here are a first proportional control feedback gain fbpDATA1, first integral control feedback gain fbiDATA1 and first differential control feedback gain fbdDATA1 which are set based on the transmission input rotation speed Ni and the vehicle speed VSP, respectively.

To set these first feedback gains, a two-dimensional map of each first feedback gain with the transmission input rotation speed Ni and vehicle speed VSP as parameters is stored beforehand in the controller 61, and the first feedback gain computing unit 80 calculates these first feedback gains by looking up each map based on the transmission input rotation speed Ni and the vehicle speed VSP.

The second feedback gain calculating unit 81 sets a second feedback gain based on the transmission oil temperature TMP and the line pressure $P_L$. The parameters set here are a second proportional control feedback gain fbpDATA2, second integral control feedback gain fbiDATA2 and second differential control feedback gain fbdDATA2. These second feedback gains are also found by looking up maps stored beforehand in the controller 61.

A feedback gain calculating unit 83 then calculates the proportional control feedback gain fbpDATA, the integral control feedback gain fbiDATA and the differential control feedback gain fbdDATA by multiplying the first feedback gains by corresponding second feedback gains.

A PID control unit 84 calculates a speed ratio feedback correction amount FBrto using the speed ratio deviation RtoERR and these feedback gains. For this purpose, a speed ratio feedback correction amount due to proportional control is found by multiplying the speed ratio deviation RtoERR by the gain fbpDATA, a speed ratio feedback correction amount due to integral control is found by multiplying the speed ratio deviation RtoERR by the gain fbiDATA, and a speed ratio feedback correction amount due to proportional control is found by multiplying the speed ratio deviation RtoERR by the gain fbdDATA. These are then substituted into the following PID control equation known in the art to calculate the speed ratio feedback correction amount FBrto.

$$FBrto = RtoERR \cdot fbpDATA + \left( \int RtoERR \right) \cdot fbiDATA + \left( \frac{d}{dt} RtoERR \right) \cdot fbdDATA$$

A speed ratio feedback correction amount limiting unit 90 calculates a controllable maximum speed ratio Lmrtomax and controllable minimum speed ratio Lmrtomin from a speed ratio command upper limiting value LIMRTOMAX and speed ratio command lower limiting value LIMRTOMIN defined beforehand, a limited speed ratio command value LmDsrRT0 calculated by a compensated transient target speed ratio limiting unit 82 described later, and the real speed ratio Ratio.

The speed ratio control by the controller 61 is repeatedly performed, for example, at an interval of 10 milliseconds.

The above-mentioned limited speed ratio command value LmDsrRT0 is the limited speed ratio command value LmDsrRT0 which the compensated transient target speed ratio limiting unit 82 calculated on the immediately preceding occasion the process was executed.

The speed ratio feedback correction amount limiting unit 90 then deducts the aforesaid torque shift compensated speed ratio TSRatio0 from the controllable maximum/minimum speed ratios Lmrtomax and Lmrtomin, respectively, and calculates a limiting value FbRTOLIMP during increase correction and a limiting value FbRTOLIMM during decrease correction. Further, the speed ratio feedback correction amount FBrto calculated by the PID control unit 84 is limited by these limiting values, and is output as a limited speed ratio feedback correction amount LmFBrto.

The adder 85 adds this limited speed ratio feedback correction amount LmFBrto to the torque shift compensated transient target speed ratio TSRaio0 by the following equation to calculate a corrected transient target speed ratio DsrRT0.

DsrRT0=TSRatio0+LmFBrto

The transient target speed ratio limiting unit 82 computes a limited speed ratio command LmDsrRTO by limiting the compensated transient target speed ratio DsrRT0 obtained in this way to a range specified by the above-mentioned speed ratio command upper limiting value LIMRTOMAX and speed ratio command lower limiting value LIMRTOMIN.

A target step number calculating unit 86 calculates a target number of steps DsrSTP of the step motor 4 corresponding to the limited speed ratio command LmDsrRTO by looking up a map stored beforehand in the controller 61.

On the other hand, a step motor drive rate determining unit 88 determines a physical operating limit rate of the step motor 4 based on the oil temperature TMP of the transmission.

A step motor drive position command computing unit 87 determines whether or not the step motor 4 can attain a target numbers of steps DsrSTP in the aforesaid speed ratio control cycle based on this physical operating limit rate. A value obtained by correcting the target step number DsrSTP based on the physical operating limit rate is set as the command signal Astep.

In this invention, the deviation determining unit 89 calculates a difference ΔSTP between the target step number DsrSTP and speed change command signal Astep. The processing performed by the deviation determining unit 89 is performed after the target step number calculating unit 86 and the step motor drive position command calculating unit 87 have respectively output the target step number DsrSTP and the command signal Astep, and the result is used on the next occasion the process is executed.

The deviation determining unit 89 sets a limiting deviation $\Delta STP_{LIM}$ which can be corrected within a period from the present occasion when the process is executed to the next occasion when the process is executed by the step motor 4, i.e., within one control cycle, based on the aforesaid physical operating limit rate calculated by the step motor drive rate determining unit 88.

If the deviation $\Delta STP$ on the present occasion when the process is executed is equal to or less than the limiting deviation $\Delta STP_{LIM}$, it is determined that the deviation $\Delta STP$ can be corrected until the next occasion when the process is executed. In this case, a limit is not imposed on the calculation of the above-mentioned speed ratio feedback correction amount FBrto performed by the PID control unit 84 on the next occasion the process is executed.

However, if the deviation $\Delta STP$ on the present occasion when the process is executed exceeds the limiting deviation $\Delta STP_{LIM}$, it is determined that the deviation $\Delta STP$ cannot be corrected by the time the process is executed on the next occasion. In this case, the PID control unit 84 is commanded so that the PID control unit 84 retains the integral control part, i.e., $\int RtoERR \cdot fbiDATA$, to the value on the present occasion the process is executed in the calculation of the aforesaid speed ratio feedback correction amount FBrto.

Here, the difference between the limitation added by the step motor drive position command calculating unit 87 to the target step number DsrSTP, and the limitation added by the deviation determining unit 89 to the speed ratio feedback correction amount FBrto calculated by the PID control unit 84, will be described.

The step motor drive position command calculating unit 87 limits the target step number DsrSTP to a range which can be realized physically in practice, so the step motor 4 always follows the command signal Astep, which is the target step number after limitation.

However, when a deviation arises between the target step number DsrSTP and command signal Astep, on the next occasion the process is executed, the integral correction amount of the speed ratio feedback correction performed by the PID control unit 84 will increase. If this state continues, the feedback correction amount continues to increase, and the tendency to increase will not be eliminated until the transient target speed ratio falls below the upper limiting value or rises above the lower limiting value. Due to this limitation performed by the step motor drive position command calculating unit 87, the state where the feedback correction amount is effectively not reflected in speed ratio control continues, and if the correction amount continues to increase, it will cause subsequent overshoot of the speed ratio or delay in convergence to the transient target speed ratio.

Therefore, if the deviation determining unit 89 determines that the deviation $\Delta STP$ between the target step number DsrSTP and the command signal Astep is larger than the limiting deviation $\Delta STP_{LIM}$, the integral correction amount is retained to the value at the time the determination is made in the calculation of the speed ratio feedback correction amount performed by the PID control unit 84. If increase of the integral correction amount is suppressed, even if the state where the target step number DsrSTP differs from the command signal Astep continues, the feedback correction amount will not continue to increase, and overshoot of the speed ratio and delay of convergence to the transient target speed ratio can be prevented.

The above functions of the controller 61 are realized by execution of the routines shown in FIGS. 4–11.

Figure 4:
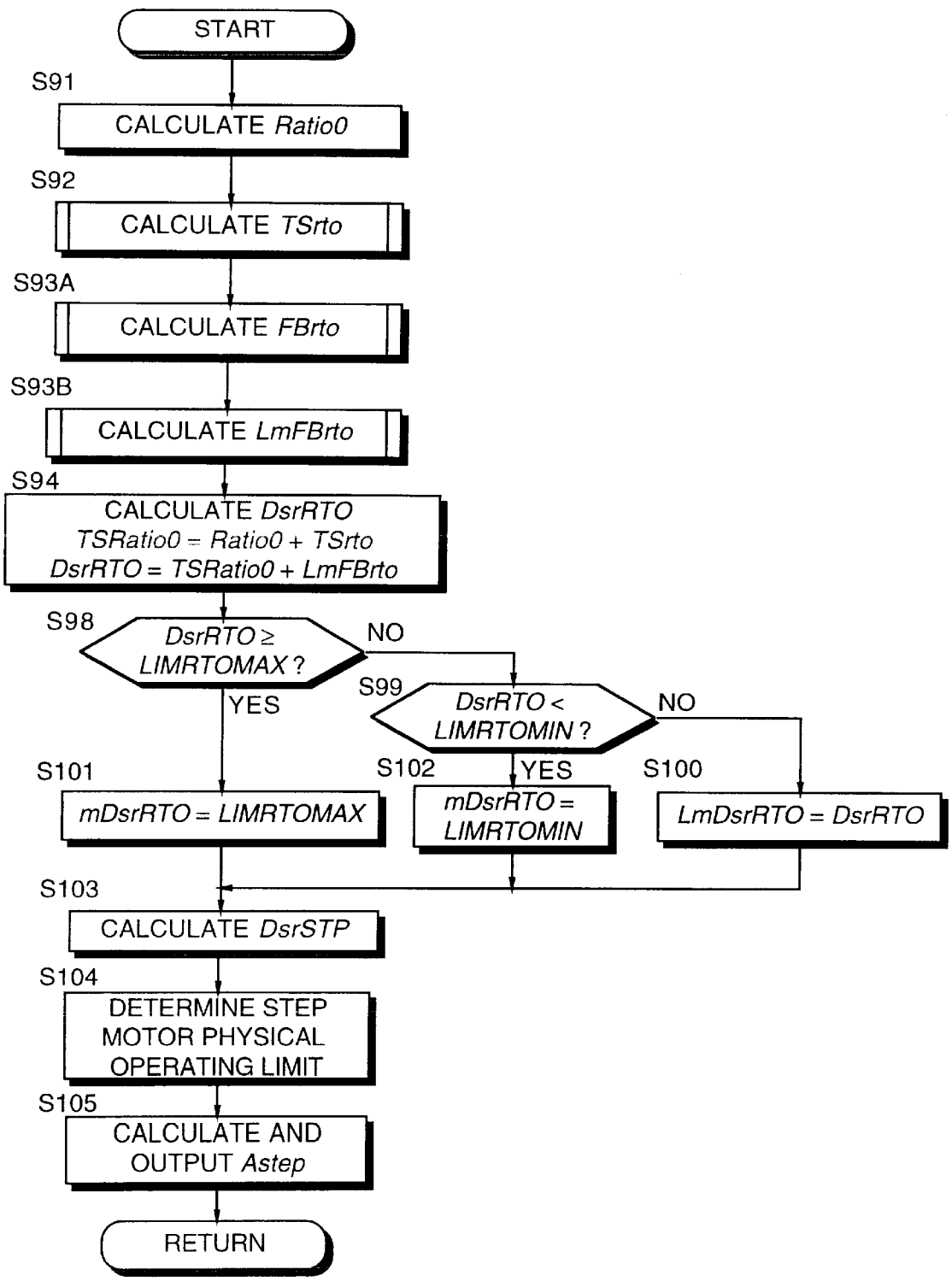
FIG. 4 is a flowchart describing a main routine of a speed ratio control performed by the controller.

FIG. 4 shows the flow of a main routine, and the other figures show the flow of subroutines. All routines are performed at an interval of, for example, 10 milliseconds.

In the main routine of FIG. 4, first in a step S91, the transient target speed ratio Ratio0 which is the target value for each control cycle is calculated.

Figure 5:
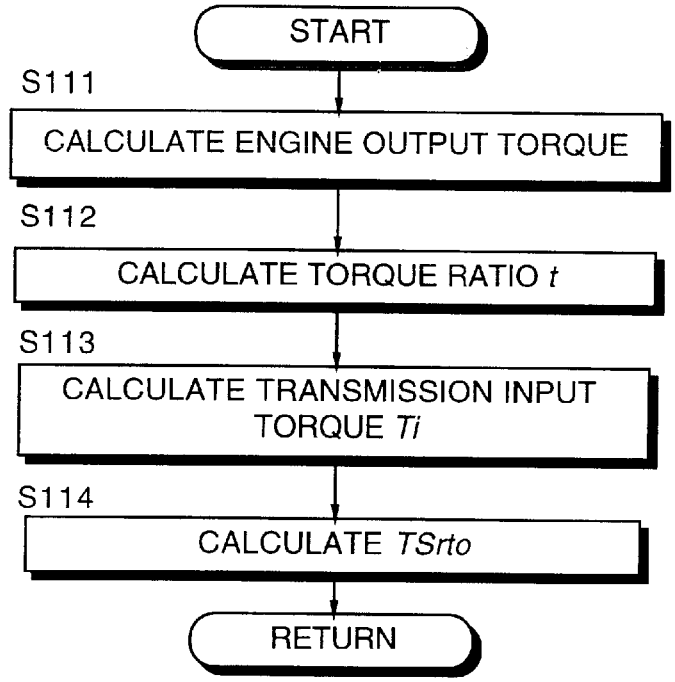
FIG. 5 is a flowchart describing a subroutine for calculating a torque shift performed by the controller.

In a step S92, the subroutine shown in FIG.5 is used to calculate the torque shift compensated speed ratio TSrto.

This subroutine is equivalent to the function of the input torque calculating unit 76 and the torque shift compensation speed ratio calculating unit 77 of the block diagram of FIG. 3. Describing this subroutine, in a step S111, the engine output torque is first calculated from the throttle opening TV0 and the engine speed Ne referring to an engine performance map stored beforehand in the controller 61. In a step S112, the torque ratio t which is the ratio of the input rotation speed and output rotation speed of the torque converter is calculated. In a step S113, the engine output torque is multiplied by torque ratio t to calculate the transmission input torque Ti.

In a step S114, the torque shift compensation speed ratio TSrto is calculated from the transmission input torque Ti and the transient target speed ratio Ratio0 which was found in the step S91 of the main routine, by looking up the map stored beforehand in the controller 61. After calculating the torque shift compensated speed ratio TSrto by the above subroutine, the main routine proceeds to a step S93A where the speed ratio feedback correction amount FBrto is calculated, and to a step S93B where the limited speed ratio feedback correction LmFBrto is calculated.

This calculation is performed by the subroutines of FIGS. 6–11 described later.

In a step S94, the torque shift compensated transient target speed ratio TSRatio0 is computed by the following equation. This is equivalent to the function of the adder 70 in the block diagram of FIG. 3.

TSRatio0=Ratio0+TSrto where, Ratio0=transient target speed ratio, and
    TSrto=torque shift compensated speed ratio.

Also, the compensated transient target speed ratio DsrRT0 is calculated by the following equation. This is equivalent to the function of the adder 85 in FIG. 3.

DsrRT0=TSrto+LmFBrto where, LmFBrto=limited feedback correction amount.

In steps S98–S101, the compensated transient target speed ratio DsrRTO is limited to a range between the final speed ratio command upper limiting value LIMRTOMAX and the final speed ratio command lower limiting value LIMRTOMIN, and the limited speed ratio command value LmDsrRT0 based on this limitation is calculated. This processing is equivalent to the function of the target step number calculating unit 82 in the block diagram of FIG. 3.

If the compensated transient target speed ratio DsrRT0 is smaller than the final speed ratio command upper limiting value LIMRTOMAX in the step S98, and greater than the final speed ratio command lower limiting value LIMRTOMIN in the step S99, the limited speed ratio command value LmDsrRTO is set equal to the corrected transient target speed ratio DsrRT0 in a step S100.

If DsrRT0≧LIMRTOMAX in the step S98, the limited speed ratio command value LmDsrRT0 is set equal to the final speed ratio command upper limiting value LIMRTOMAX in a step S101.

If DsrRT0<LIMRTOMIN in the step S99, the limited speed ratio command value LmDsrRT0 is set equal to the final speed ratio command lower limiting value LIMRTOMIN in a step S102.

In a step S103, the target step number DsrSTP of the step motor 4 for attaining the limited speed ratio command value LmDsrRT0 is calculated by looking up the map as mentioned above.

This step is equivalent to the function of the target step number calculating unit 86 in the block diagram of FIG. 3.

In the following step S104, the physical operating limit rate of the step motor 4 is determined based on the oil temperature TMP of the transmission. This step is equivalent to the function of the step motor drive rate determining unit 88 in the block diagram of FIG. 3.

In a final step S105, the command signal Astep is calculated by correcting the target step number DsrSTP calculated in the step S103 based on the physical operating limit rate determined in the step S104. This signal Astep is output to the step motor 4, and the main routine is terminated. This step is equivalent to the function of the step motor drive position command calculating unit 87 in the block diagram of FIG. 3.

Next, the subroutine of FIGS. 6–11 will be described.

Figure 6:
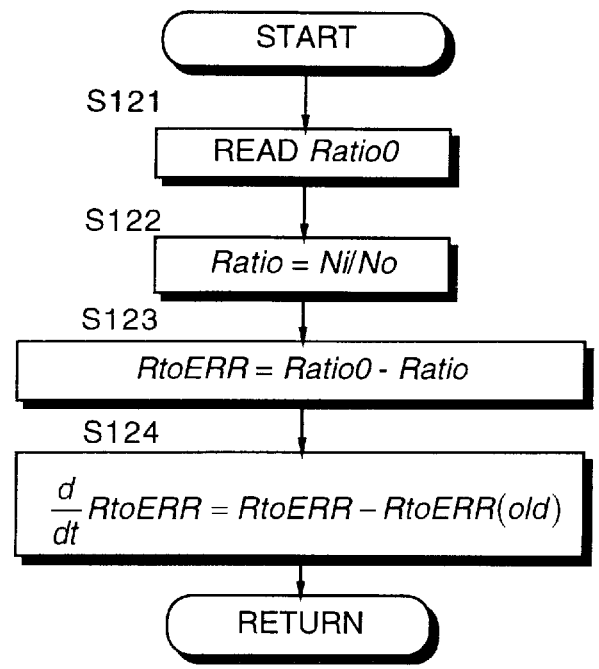
FIG. 6 is a flowchart describing a subroutine for calculating a speed ratio deviation between a transient target speed ratio and a real speed ratio performed by the controller.

FIG. 6 shows a subroutine for calculating the speed ratio deviation RtoERR.

This subroutine is equivalent to the function of the real speed ratio calculating unit 78 and the speed ratio deviation calculating unit 79 in the block diagram of FIG. 3.

First, the transient target speed ratio Ratio0 is read in a step S121. In a step S122, the rotation speed Ni of the input disk 1 is divided by the rotation speed No of the output disk 2 to calculate the real speed ratio Ratio of the continuously variable transmission.

In a step S123, the real speed ratio Ratio is deducted from the transient target speed ratio Ratio0 to calculate the speed ratio deviation RtoERR.

Further, in a step S124, a deviation between the speed ratio deviation RtoERR and the speed ratio deviation RtoERR(old) calculated on the immediately preceding occasion the routine was executed, i.e., 10 milliseconds before, is calculated as a differential value of speed ratio deviation, d/dt RtoERR.

Figure 7:
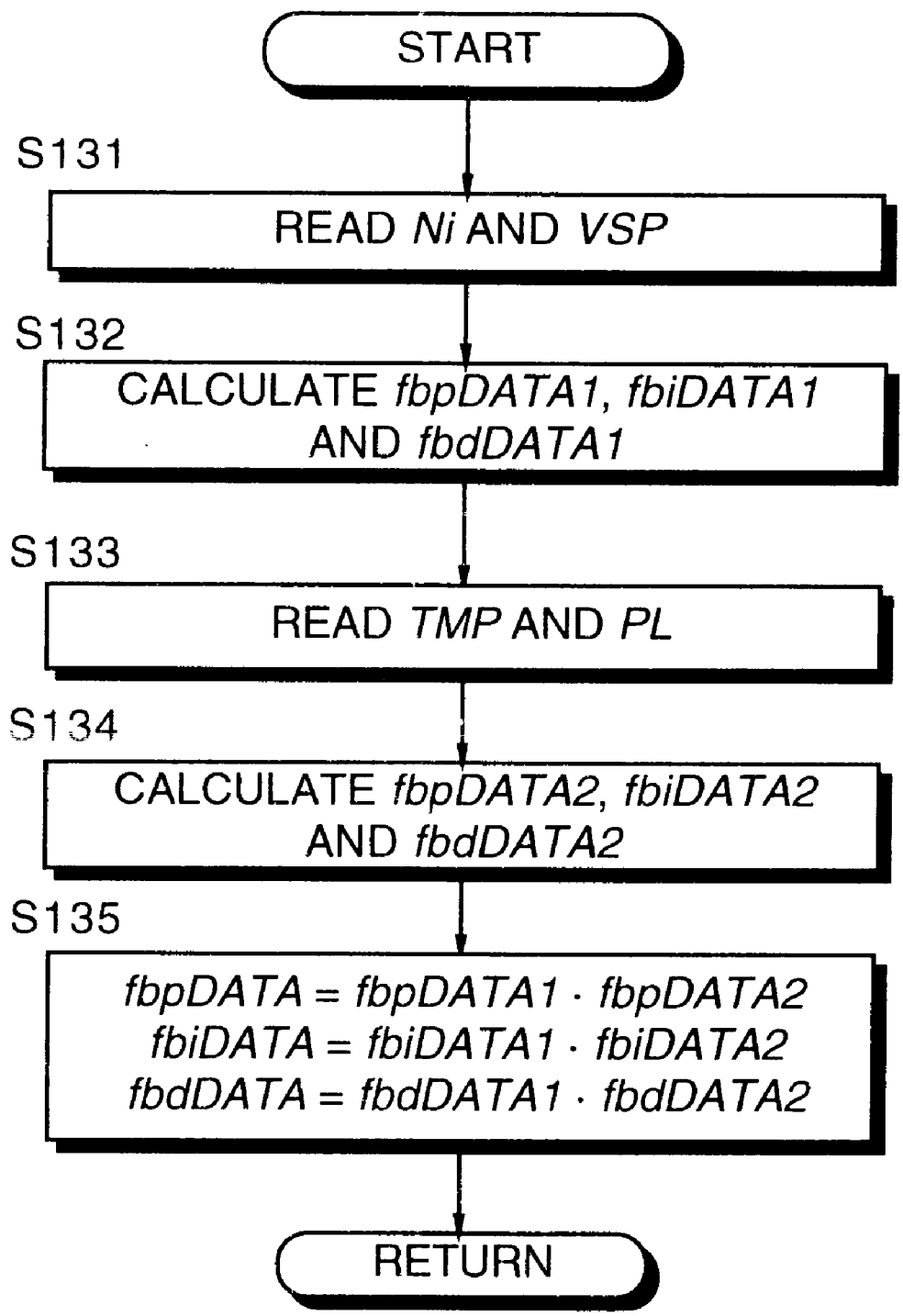
FIG. 7 is a flowchart describing a subroutine for calculating a feedback gain performed by the controller.

FIG. 7 shows a subroutine which calculates the PID control feedback gain. This subroutine is equivalent to the functions of the first feedback gain calculating unit 80, the second feedback gain calculating unit 81 and the feedback gain calculating unit 83 in the block diagram of FIG. 3. Describing this subroutine, first in a step S131, the vehicle speed VSP and a rotation speed Ni of the input disk 1 of the continuously variable transmission are read.

In a step S132, a first proportional control feedback gain fbpDATA1, first integral control feedback gain fbiDATA1 and first differential control feedback gain fbdDATA1 are calculated by looking up the maps stored beforehand in the controller 61 as mentioned above based on VSP and Ni.

In a step S133, the oil temperature TMP and the line pressure $P_L$ are read.

In a step S134, a second proportional control feedback gain fbpDATA2, second integral control feedback gain fbiDATA2 and second differential control feedback gain fbdDATA2 are calculated by looking up the maps stored beforehand in the controller 61 as mentioned above based on TMP and $P_L$.

In a step S135, the proportional control feedback gain fbpDATA, integral control feedback gain fbiDATA and differential control feedback gain fbdDATA are calculated by multiplying the first gains by corresponding second gains.

Figure 8:
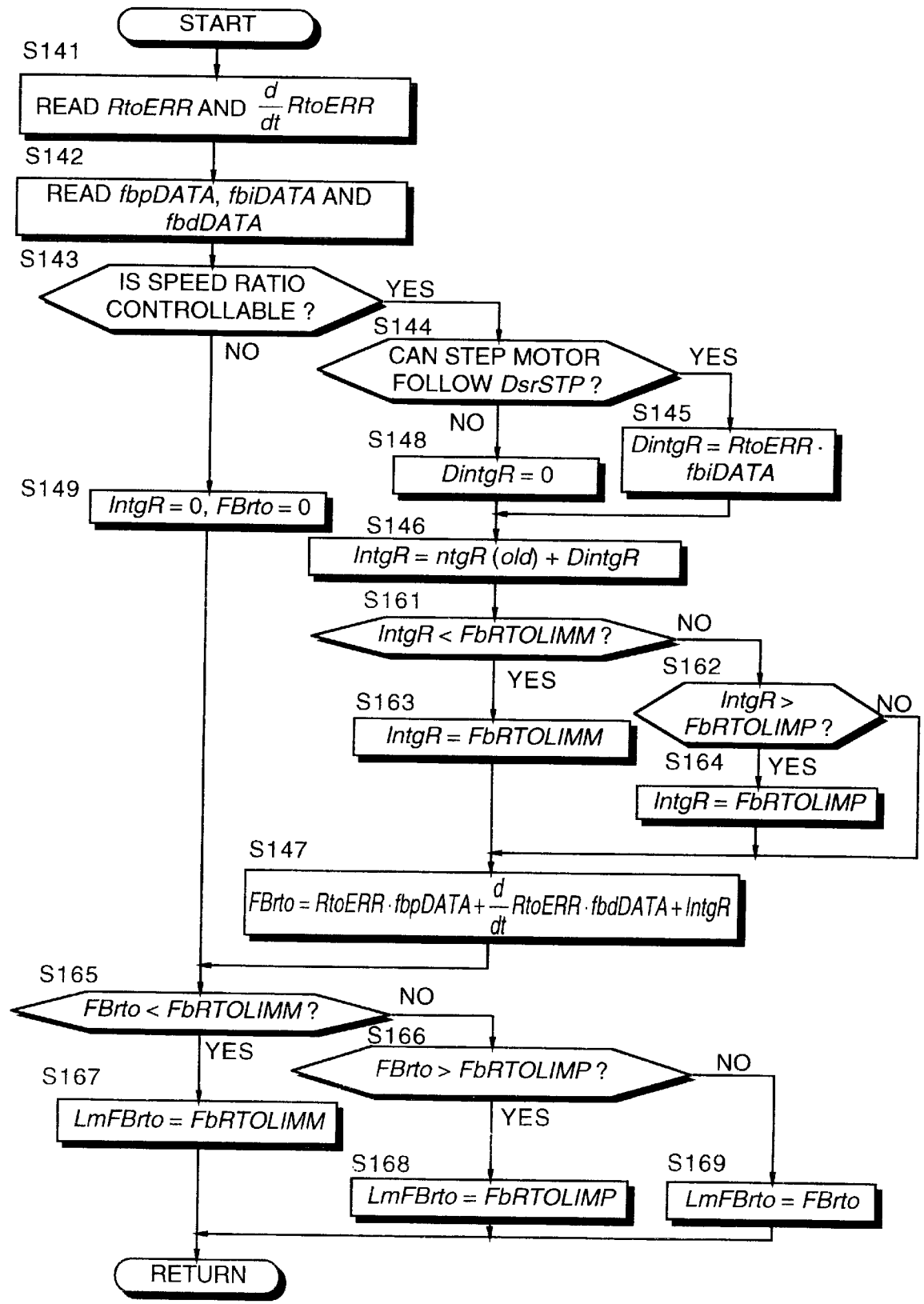
FIG. 8 is a flowchart describing a subroutine for the calculating a speed ratio feedback correction amount performed by the controller.

FIG. 8 shows a subroutine for calculating the speed ratio feedback correction amount FBrto due to PID control, and the limited speed ratio feedback correction amount LmFBrto.

This subroutine is equivalent to the functions of the PID control unit 84 and the speed ratio feedback correction amount limiting unit 90 in the block diagram of FIG. 3.

In this subroutine, in a step S141, the speed ratio deviation RtoERR and its differential value $$\frac{d}{dt} RtoERR,$$

both of which were calculated by the subroutine of FIG. 6, are read. In the next step S142, the feedback gains fbpDATA, fbiDATA and fbdDATA which were found in the subroutine of FIG. 7, are read.

In a step S143, it is determined from the vehicle speed VSP and the rotation speed Ni of the input disk whether or not the speed ratio is controllable. When the vehicle speed VSP and the rotation speed Ni of the input disk 1 are 0, the vehicle is not running, the speed ratio of the continuously variable transmission cannot be varied, and it is determined that the speed ratio is not controllable.

From the above determination, if the speed ratio is controllable, the subroutine proceeds to a step S144 and it is determined whether or not the step motor 4 can follow the target step number DsrSTP. The target step number DsrSTP is calculated by the main routine in the step S103 as described above, therefore, the target step number DsrSTP used here is the value calculated on the immediately preceding occasion when the main routine was executed. That is, in the step S144, it is determined whether or not the target step number DsrSTP calculated on the immediately preceding occasion the routine was executed, can be attained during the period until the routine is executed on the present occasion.

Figure 11:
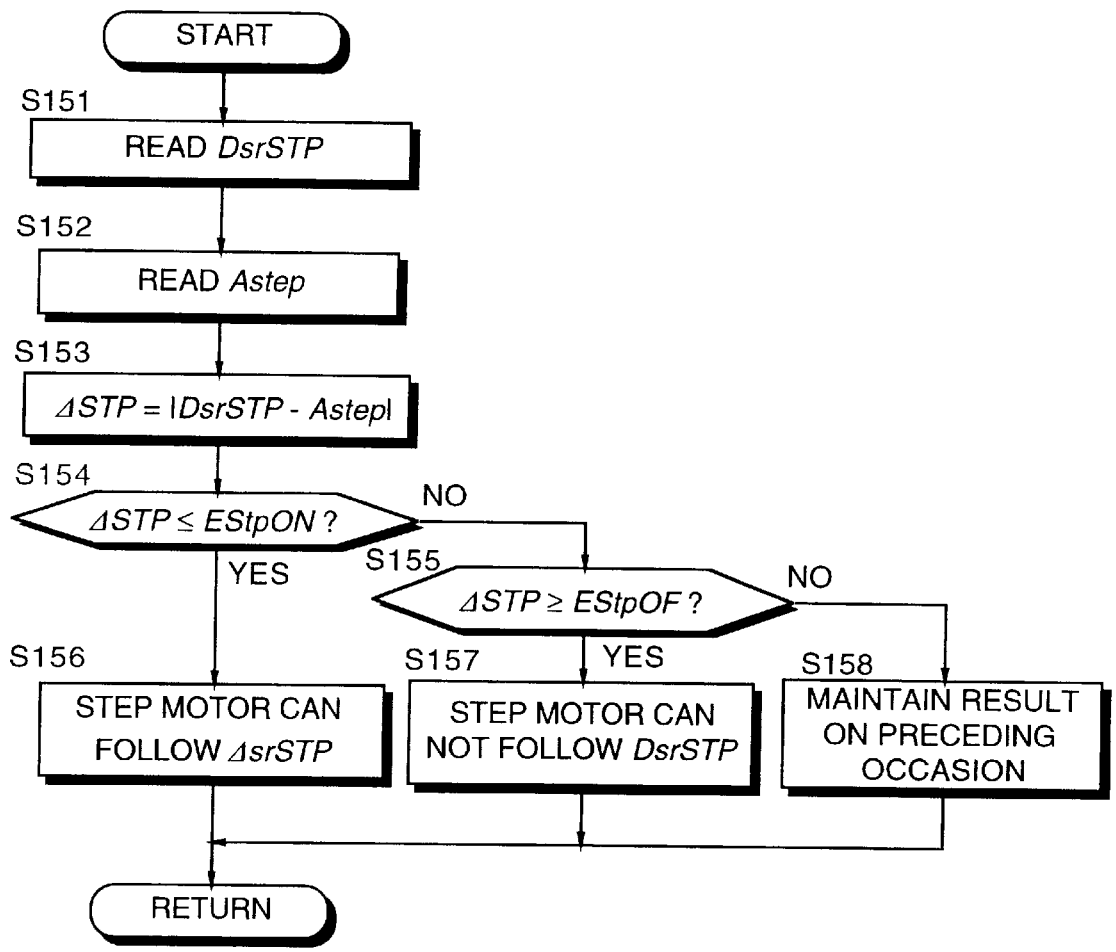
FIG. 11 is a flowchart describing a subroutine for determining a recoverability of a deviation by a step motor performed by the controller.

This determination is performed by the subroutine shown in FIG. 11.

This subroutine will be described referring to FIG. 11.

First, in a step S151, the target step number DsrSTP is read.

This is the value which was calculated on the immediately preceding occasion the main routine was executed, as already stated.

In a following step S152, the command signal Astep output to the step motor 4 on the immediately preceding occasion the main routine was executed, is read. This command signal Astep is considered to be the present position of the step motor 4. In a next step S153, the deviation ΔSTP between the target step number DsrSTP and speed change command signal Astep is calculated by the following equation.

ΔSTP=|DsrSTP−Astep|

In a step S154, it is determined whether or not the deviation ΔSTP is equal to or less than a first critical deviation EStpON. When the deviation ΔSTP is larger the value EStpON, in a step S155, it is determined whether or not the deviation ΔSTP is equal to or greater than a second critical deviation EStpOF.

These first and second critical deviations are determined in the step S104 of the main routine from the limiting drive rate of the step motor 4. Therefore, these values are also based on the data when the main routine was performed on the immediately preceding occasion.

Here, the reason for setting the first and second critical deviations EStpON and EStpOF is in order to introduce hysteresis.

In the step S154, when the deviation ΔSTP is less than the first critical deviation EStpON, it is determined in a step S156 that the step motor 4 can follow the target step number DsrSTP.

On the other hand, when the deviation ΔSTP is equal to or greater than the second critical deviation EStpOF, it is determined in a step S157 that the step motor 4 cannot follow the target step number DsrSTP.

In the step S155, when the deviation ΔSTP is less than the second critical deviation EStpOF, the subroutine proceeds to a step S158 and the determining result on the immediately preceding occasion, i.e., whether or not the step motor 4 can follow the target step number DsrSTP, is maintained as it is.

When it is determined by this subroutine that the step motor 4 can follow the target step number DsrSTP, the determining result of the step S144 of the subroutine of FIG. 8 is affirmative.

In this case, an integral correction amount increase value DintgR with respect to the speed ratio feedback correction amount, during the period from the immediately preceding occasion the main routine was executed to the present occasion when the main routine is executed, is calculated by the following equation in a step S145.

$$DintgR = RtoERR \cdot fbiDATA$$

Further, in a step S146, the integral correction amount increase value DintgR is added to an integral correction amount IntgR (old) which was calculated on the immediately preceding occasion, by the following equation so as to calculate the integral correction amount present value IntgR.

In the following steps S161–S164, the integral correction amount present value IntgR is limited by the decrease correction limiting value FbRTOLIMM, and the increase correction limiting value FbRTOLIMP. The method of determining these limiting values FbRTOLIMM and FbR-TOLIMP will be described later.

In the step S161, it is determined whether or not the integral correction amount present value IntgR is less than the decrease correction limiting value FbRTOLIMM. As both are negative values, the fact that the integral correction amount present value IntgR is less than the decrease correction limiting value FbRTOLIMM means that the absolute value of the former is larger than the absolute value of the latter. In this case, the integral correction amount present value IntgR is set equal to the feedback correction amount limiting value FbRTOLIMM.

When the integral correction amount present value IntgR is equal to or greater than the decrease correction limiting value FbRTOLIMM, it is determined in the step S162 whether or not the integral correction amount present value IntgR is larger than the increase correction limiting value FbRTOLIMP.

When the integral correction amount present value IntgR is larger than the increase correction limiting value FbRTOLIMP, the integral correction amount present value IntgR is set equal to the increase correction limiting value FbRTOLIMP in the step S164.

When the integral correction amount present value IntgR is less than the increase correction limiting value FbRTOLIMP, the integral correction amount present value IntgR is used without modification.

Using the integral correction amount present value IntgR limited in this way, the speed ratio feedback correction amount FBrto is calculated by the following equation in a step S147.

$$FBrto = RtoERR \cdot fbpDATA + \left(\frac{d}{dt} RtoERR\right) \cdot fbdDATA + IntgR$$

On the other hand, if it is determined in the step S144 that the step motor 4 cannot follow the target step number DsrSTP, the subroutine proceeds to a step S148. Here, the integral correction amount increase value DintgR on the present occasion is set to 0, and the routine proceeds to the step S146.

In this case, the integral correction amount IntgR is maintained at the same value as on the immediately preceding occasion the main routine was executed, i.e., IntgR (old). Hence, when the state where the step motor 4 cannot follow the target step number DsrSTP continues, the feedback correction integral correction amount is prevented from increasing cumulatively.

In steps S165–S169, the speed ratio feedback correction amount FBrto found in the step S147 is limited by the decrease correction limiting value FbRTOLIMM and the increase correction limiting value FbRTOLIMP as in the steps S161–S164.

That is, when FBrto<FbRTOLIMM in the step S165, the limited speed ratio feedback correction amount LmFBrto is set equal to the decrease correction limiting value FbR-TOLIMM in the step S167. Conversely, when FBrto>FbRTOLIMP in the step S166, the limited speed ratio feedback correction amount LmFBrto is set equal to the increase correction limiting value FbRTOLIMP in the step S168.

As a result of the determining of the steps S165, S166, when FbRTOLIMM≦FBrto≦FbRTOLIMP, in the step S169, the limited speed ratio feedback correction amount LmFBrto is set equal to the speed ratio feedback correction amount FBrto calculated in the step S147.

When it is determined in the step S143 that the continuously variable transmission is not in a state where the speed ratio can be controlled, the integral correction amount IntgR and the speed ratio feedback correction amount FBrto are both reset to 0 in a step S149. As a result, in subsequent processes, the limited speed ratio feedback correction amount LmFBrto0 is also reset to 0 in the step S169.

Next, the method of determining the negative feedback correction amount limiting value FbRTOLIMM and positive feedback correction amount limiting value FbRTOLIMP will be described referring to FIGS. 9 and 10.

Figure 9:
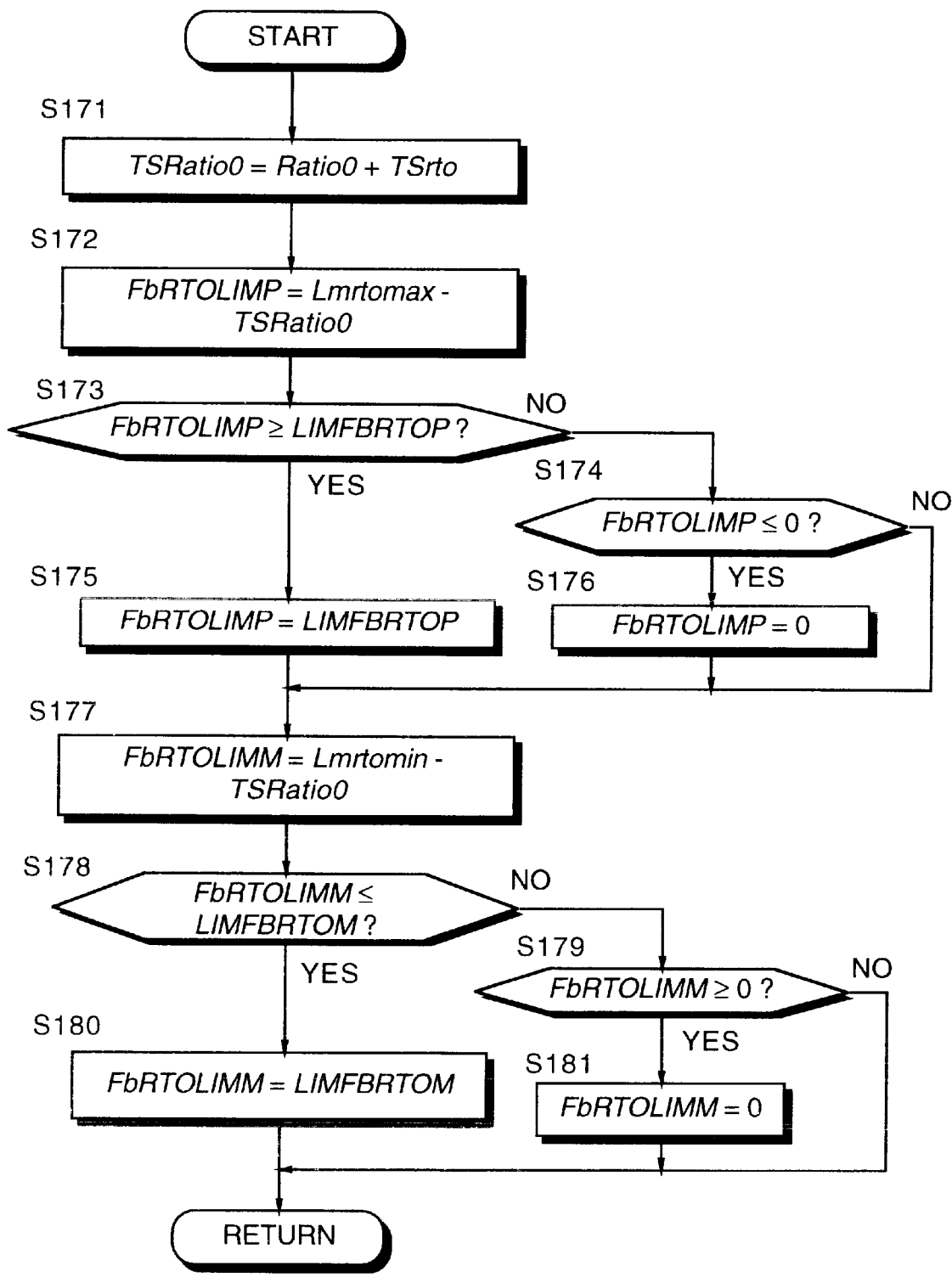
FIG. 9 is a flowchart describing a subroutine for calculating a feedback correction amount limiting value performed by the controller.
Figure 10:
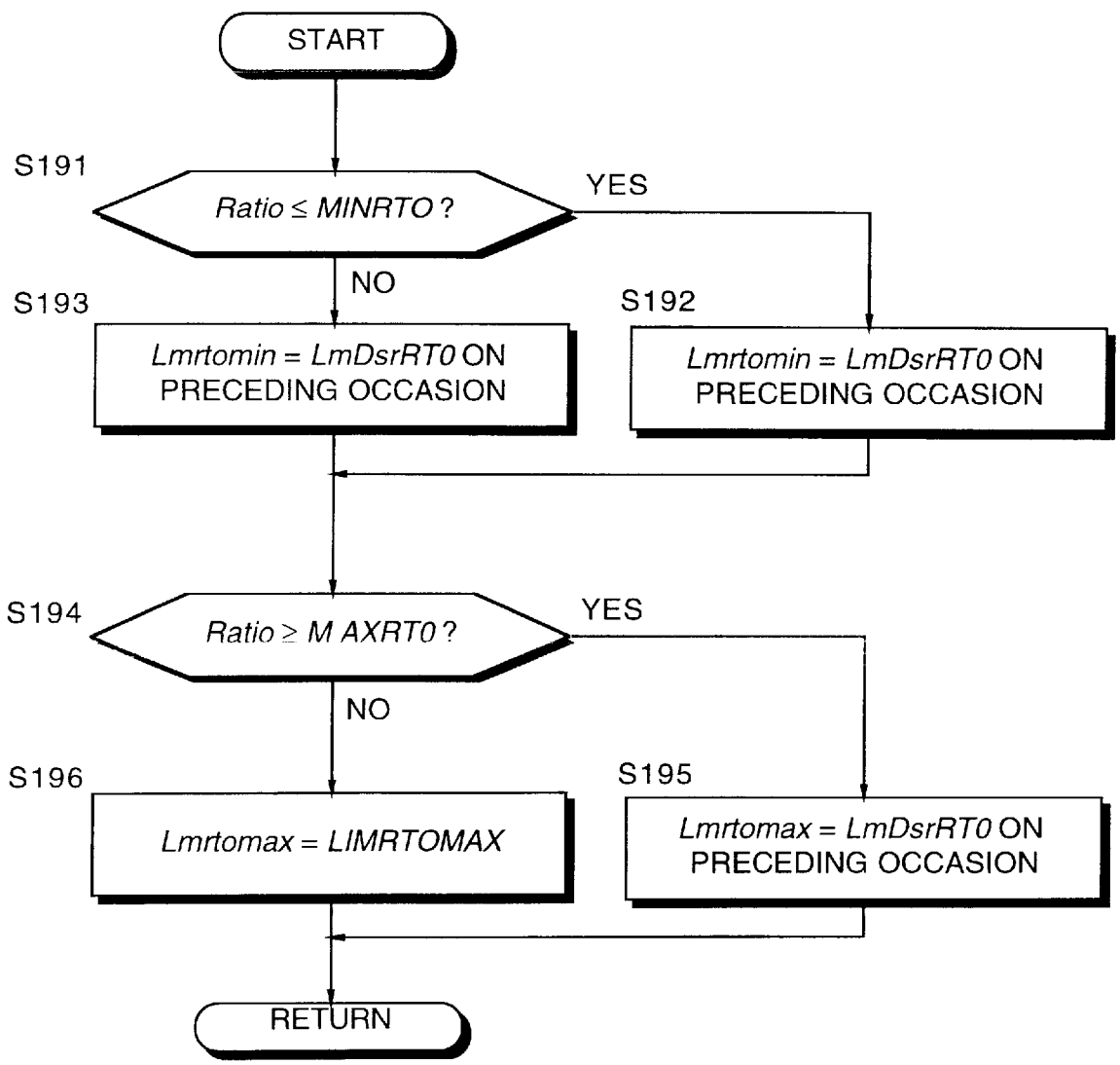
FIG. 10 is a flowchart describing a subroutine for calculating a controllable critical speed ratio performed by the controller.

FIG. 9 shows a subroutine for calculating the limiting values FbRTOLIMM and FbRTOLIMP, and FIG. 10 shows a subroutine for calculating the controllable minimum speed ratio Lmrtomin and controllable maximum speed ratio Lmrtomax which are used in the calculation. The subroutine of FIG. 9 is equivalent to the function of the torque shift compensated speed ratio calculating unit 77 and the adder 70 of FIG. 3.

In FIG. 9, in a step S171, the torque shift compensated transient target speed ratio TSRatio0 is calculated as in the above-mentioned step S94.

In a step S172, the increase correction limiting value FbRTOLIMP is calculated by deducting the torque shift compensated transient target speed ratio TSRatio0 from the maximum controllable speed ratio Lmrtomax calculated by the subroutine of FIG. 10.

In the next step S173, it is determined whether or not this limiting value FbRTOLIMP is equal to or greater than a positive critical value LIMFBRTOP equivalent to a step increase operating limit of the step motor 4.

When the limiting value FbRTOLIMP is equal to or greater than the positive critical value LIMFBRTOP, the limiting value FbRTOLIMP is set equal to the positive critical value LIMFBRTOP in a step S175. When the limiting value FbRTOLIMP is less than the positive critical value LIMFBRTOP, it is determined whether or not the increase correction limiting value FbrTOLIMP is a negative value in a step S174.

When the increase correction limiting value FbRTOLIMP is a negative value, the limiting value FbRTOLIMP is reset to 0 in a step S176. When the increase correction limiting value FbRTOLIMP is a value between 0 and the positive critical value LIMFBRTOP, a limit is not applied to the increase correction limiting value FbRTOLIMP.

In a step S177, the decrease correction limiting value FbRTOLIMM is calculated by subtracting the torque shift compensated speed ratio TSRatio0 from the controllable minimum speed ratio Lmrtomin calculated by the subroutine in FIG. 10.

In the next step S178, it is determined whether or not this limiting value FbRTOLIMM is less than a negative critical value LIMFBRTOM equivalent to a step decrease operating limit of the step motor 4. When the decrease correction limit value FbRTOLIMM is less than the negative critical value LIMFBRTOM, the decrease correction limiting value FbRTOLIMM is set equal to the negative critical value LIMFBRTOM in a step S180. When the decrease correction limiting value FbRTOLIMM is larger than the negative critical value LIMFBRTOM, it is determined whether or not the decrease correction limiting value FbRTOLJMM is a positive value in the step S179.

When the decrease correction limiting value FbRTOLIMM is a positive value, the limiting value FbRTOLIMM is reset to 0 in a step S181.

When the decrease correction limiting value FbRTOLIMM is a value between 0 and the negative critical value LIMFBRTOM, a limit is not applied to the decrease correction limiting value FbRTOLIMM.

Next, the subroutine for calculating the controllable minimum speed ratio Lmrtomin and controllable maximum speed ratio Lmrtomax will be described referring to FIG. 10.

First, in a step S191, it is determined whether or not the real speed ratio Ratio is less than a minimum speed ratio MINRTO based on the specification of the hardware of the continuously variable transmission. Normally, although the real speed ratio Ratio does not fall below the minimum speed ratio MINRTO, such a case may occur due to an external disturbance such as a torque shift. If Ratio≦MINRTO, the controllable minimum speed ratio Lmrtomin is set equal to the limited speed ratio command value LmDsrRT0 on the immediately preceding occasion in a step S192.

On the other hand, if Ratio>MINRTO, the controllable minimum speed ratio Lmrtomin is set equal to the speed ratio command lower limiting value LIMRTOMIN which was used in the steps S98–S102 of FIG. 4.

Next, in a step S194, it is determined whether or not the real speed ratio Ratio is equal to or greater than a maximum speed ratio MAXRTO based on the specification of the hardware of the continuously variable transmission. Normally, although the real speed ratio Ratio does not become greater than the maximum speed ratio MAXRTO, such a case may occur due to an external disturbance such as a torque shift. If Ratio≧MINRTO, the maximum controllable speed ratio Lmrtomax is set equal to the limited speed ratio command value LmDsrRTO on the immediately preceding occasion in a step S195.

On the other hand, if Ratio<MAXRTO, in the step S196, the controllable maximum speed ratio Lmrtomax is set equal to the speed ratio command upper limiting value LIMRTOMAX which was used in the steps S98–S102 of FIG. 4.

The contents of Tokugan Hei 10-175694, with a filing date of Jun. 23, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the above embodiments describe the application of this invention to a toroidal continuously variable transmission, but it may applied to a V-belt continuously variable transmission.

Further, it may be applied also to a non-continuous automatic transmission wherein a gear ratio is varied under a desired time constant by directly controlling the oil pressure of frictional components used in speed change, such as an oil pressure clutch or an oil pressure brake.

What is claimed is:

1. A speed ratio controller for controlling a speed ratio of a transmission of a vehicle in a predetermined control cycle, said controller comprising:

a sensor for detecting a running condition of the vehicle, a sensor for detecting a real speed ratio of the transmission, and a microprocessor programmed to:

calculate a transient target speed ratio of the transmission based on said vehicle running condition, calculate a deviation between said real speed ratio and said transient target speed ratio, calculate a feedback correction amount based on said deviation, calculate a command value based on said transient target speed ratio and said feedback correction amount, control a speed ratio of said transmission based on said command value, calculate a difference between said command value and a command value applied in a previous control cycle, and suppress increase of said feedback correction amount in a following control cycle when said difference is larger than a predetermined value.

2. A speed ratio controller as defined in claim 1, wherein said transmission is connected to an engine of which the output varies according to the opening of a throttle, and wherein said running condition detecting sensor comprises a sensor for detecting said throttle opening, and a sensor for detecting a vehicle speed.

3. A speed ratio controller as defined in claim 1, wherein said feedback correction amount comprises an integral correction amount obtained by applying a predetermined integral processing to said deviation, and said microprocessor is further programmed to suppress increase of said feedback correction amount in the next control cycle by prohibiting increase of said integral correction amount, when said difference is larger than said predetermined value.

4. A speed ratio controller as defined in claim 1, wherein said transmission varies a speed ratio according to a pressure of oil, said speed ratio controller further comprises a sensor for detecting a temperature of said oil, and said microprocessor is further programmed to vary said predetermined value based on said oil temperature.

5. A speed ratio controller as defined in claim 1, wherein said controller further comprises an actuator which in response to said command value varies said speed ratio of the transmission, and said microprocessor is programmed to determine if said actuator can achieve said command value, and limit said command value when said actuator can not achieve said command value.

6. A speed ratio controller as defined in claim 1, wherein said controller comprises a step motor which in response to said command value varies said speed ratio of said transmission at a rate less than a maximum operating rate, and said microprocessor is programmed to determine said predetermined value based on said maximum operating rate.

7. A speed ratio controller as defined in claim 1, wherein said microprocessor is programmed to determine said predetermined value with a predetermined hysteresis.

8. A speed ratio controller for controlling a speed ratio of a transmission of a vehicle in a predetermined control cycle, said controller comprising:

a sensor for detecting a running condition of the vehicle, a sensor for detecting a real speed ratio of the transmission, means for calculating a transient target speed ratio of the transmission based on said vehicle running condition, means for calculating a deviation between said real speed ratio and said transient target speed ratio, means for calculating a feedback correction amount based on said deviation, means for calculating a command value based on said transient target speed ratio and said feedback correction amount, means for controlling a speed ratio of said transmission based on said command value, means for calculating a difference between said command value and a command value applied in a previous control cycle, and means for suppressing increase of said feedback correction amount in a following control cycle when said difference is larger than a predetermined value.

9. A speed ratio control method for controlling a speed ratio of a transmission of a vehicle in a predetermined control cycle, said method comprising:

detecting a running condition of the vehicle, detecting a real speed ratio of the transmission, calculating a transient target speed ratio of the transmission based on said running conditions, calculating a deviation between said real speed ratio and said transient target speed ratio, calculating a feedback correction amount based on said deviation, calculating a command value based on said transient target speed ratio and said feedback correction amount, controlling a speed ratio of said transmission based on said command value, calculating a difference between said command value and a command value applied in a previous control cycle, and suppressing increase of said feedback correction amount in a following control cycle when said difference is larger than a predetermined value.

* * * * *